United States Patent
Yang

(10) Patent No.: US 10,118,868 B2
(45) Date of Patent: Nov. 6, 2018

(54) PRODUCTION METHOD OF ARTIFICIAL BIO-SOIL AGGREGATES BASED ON FOAMED CONCRETE FOR PLANT GROWTH

(71) Applicant: KYONGGI UNIVERSITY INDUSTRY AND ACADEMIA COOPERATION FOUNDATION, Suwon-si (KR)

(72) Inventor: Keun-Hyeok Yang, Suwon-si (KR)

(73) Assignee: Kyonggi University Industry and Academia Cooperation Foundation, Suwon-si (KR)

( * ) Notice: Subject to any disclaimer, the term of this patent is extended or adjusted under 35 U.S.C. 154(b) by 74 days.

(21) Appl. No.: 15/110,021

(22) PCT Filed: Dec. 11, 2015

(86) PCT No.: PCT/KR2015/013613
§ 371 (c)(1),
(2) Date: Jul. 6, 2016

(87) PCT Pub. No.: WO2016/167440
PCT Pub. Date: Oct. 20, 2016

(65) Prior Publication Data
US 2017/0044077 A1 Feb. 16, 2017

(30) Foreign Application Priority Data

Apr. 13, 2015 (KR) .................. 10-2015-0052045

(51) Int. Cl.
*C05G 3/00* (2006.01)
*C04B 38/10* (2006.01)
(Continued)

(52) U.S. Cl.
CPC .............. *C05G 3/00* (2013.01); *A01G 24/00* (2018.02); *C04B 18/027* (2013.01); *C04B 38/10* (2013.01);
(Continued)

(58) Field of Classification Search
CPC ...... C05G 3/00; C05G 3/0076; C04B 18/027; C04B 38/10; C04B 2111/00758;
(Continued)

(56) References Cited

U.S. PATENT DOCUMENTS

| 4,883,535 A | 11/1989 | Hamaguchi et al. | |
| 2002/0132882 A1* | 9/2002 | Hilton | B01F 5/0406 524/4 |

FOREIGN PATENT DOCUMENTS

| CN | 101823859 A | 9/2010 |
| CN | 101897289 A | 12/2010 |

(Continued)

OTHER PUBLICATIONS

International Search Report dated Dec. 11, 2015 in counterpart International Application No. PCT/KR2015/013613 (3 pages in Korean).
(Continued)

*Primary Examiner* — Jennifer A Smith
(74) *Attorney, Agent, or Firm* — NSIP Law

(57) ABSTRACT

A method of producing artificial bio-soil aggregates based on foamed concrete for plant growth that can ensure sufficient moisture and plant nutrients for the habitat of plants in non-soil conditions; obtain a lightweight, durable, and deep soil layer, and continuously provide a favorable environment for plant growth. A paste is prepared by mixing cement with an admixture, such as ochre and burnt-furnace slag; foamed concrete is formed by adding foam bubbles with an appropriate foaming rate to said paste, thereby producing soil
(Continued)

concrete. When the foamed concrete is used, a designated compressive strength can be ensured and a number of pore spaces are formed, which allow the air to be sucked and expelled therethrough and store moisture therein. Also, hydrogel that is incorporated into the foamed concrete may supply nutrients required for plant growth, improve pest resistance, and store and supply a large amount of water.

2 Claims, 2 Drawing Sheets

(51) Int. Cl.
 *C05B 17/00* (2006.01)
 *C05D 1/02* (2006.01)
 *C04B 18/02* (2006.01)
 *A01G 24/00* (2018.01)
 *C04B 111/00* (2006.01)
 *A01G 24/48* (2018.01)

(52) U.S. Cl.
 CPC ............... *C05B 17/00* (2013.01); *C05D 1/02* (2013.01); *C05G 3/0076* (2013.01); *A01G 24/48* (2018.02); *C04B 2111/00758* (2013.01); *Y02W 30/92* (2015.05); *Y02W 30/94* (2015.05)

(58) Field of Classification Search
 CPC .................. C05B 17/00; A01G 31/001; A01G 2031/003; C05D 1/02; Y02W 30/94; Y02W 30/92
 See application file for complete search history.

(56) References Cited

FOREIGN PATENT DOCUMENTS

| KR | 1987-0011059 A | 12/1987 |
|---|---|---|
| KR | 1999-024204 A | 3/1999 |
| KR | 2000-0007185 A | 2/2000 |
| KR | 10-0296975 B1 | 10/2001 |
| KR | 2002-0084398 A | 11/2002 |
| KR | 10-0536458 B1 | 12/2005 |
| KR | 10-2011-0126446 A | 11/2011 |

OTHER PUBLICATIONS

Li, Zheng Qi. "Study on Properties of Porous Ecological Concrete for Plant-Growing in China." *Advanced Materials Research*. vol. 560. Trans Tech Publications, 2012. (7 pages, in English).

Chinese Office Action dated Feb. 11, 2018 in counterpart Chinese Patent Application 201580006758.9 (5 pages, in Chinese).

\* cited by examiner

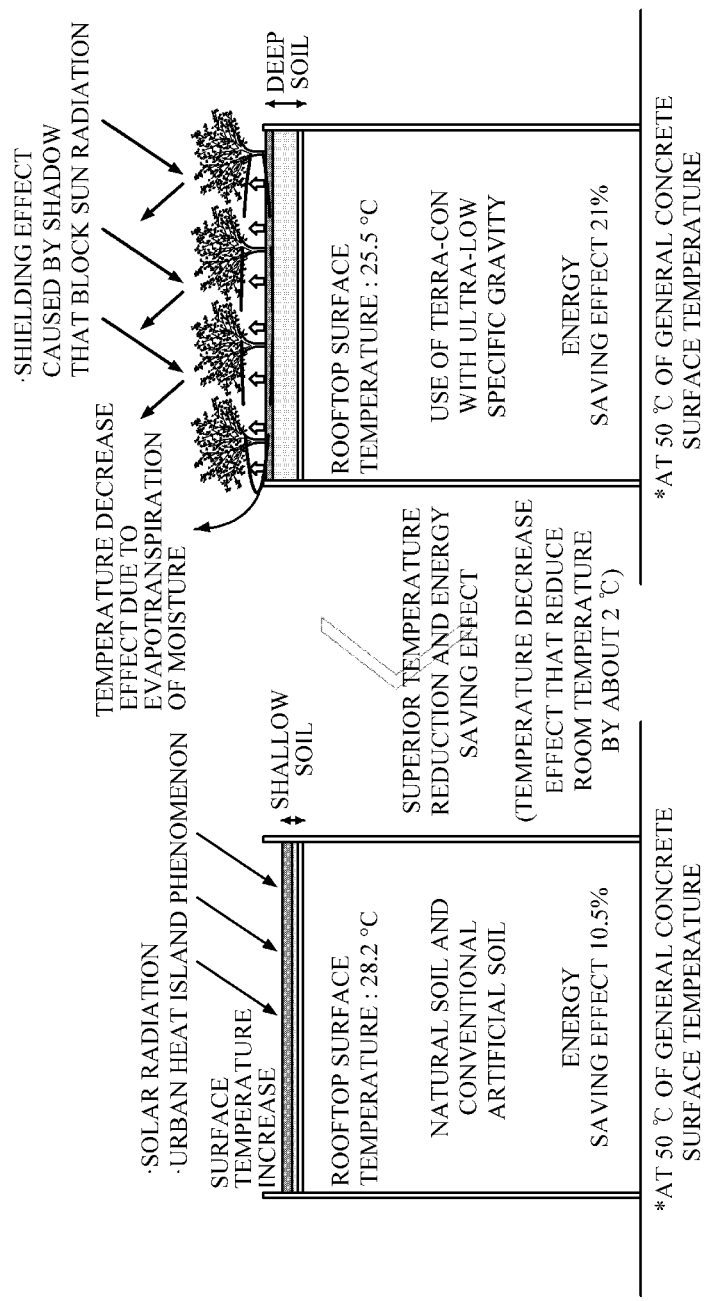

PRODUCTION METHOD OF ARTIFICIAL BIO-SOIL AGGREGATES BASED ON FOAMED CONCRETE FOR PLANT GROWTH

CROSS REFERENCE TO RELATED APPLICATIONS

This application is a National Phase entry of PCT Application No. PCT/KR2015/013613, filed on Dec. 11, 2015, which claims the benefit of Korean Patent Application No. 10-2015-0052045, filed on Apr. 13, 2015, the entire disclosures of each of which are incorporated herein by reference for all purposes.

TECHNICAL FIELD

The present invention relates to a method to produce artificial bio-soil aggregates based on foamed concrete for plant growth.

BACKGROUND ART

In road afforestation, green roofs, urban agriculture, etc., plant growth environments are provided using natural soil or artificial soil containing the nutrients.

In a prior art (e.g., Korean Patent Registration No. 10-0536458, titled "Manufacturing Method for Soil Concrete"), soil concrete for providing plant growth environment is formed by mixing cement and ochre with a soil stabilizer and water. In soil concrete prepared as such, the level of porosity due to external temperature change is minimal, and hence has excellent water repellency, freeze-proof performance, and durability. However, the following problems may arise when forming a soil layer.

First, due to the complex structure of cultivated soil for plant growth, a number of processes need to be undertaken during the forming of the soil layer. Second, it is difficult to secure sufficient moisture and nourishment to ensure a permanent plant habitat.

Third, the plant may have low pest resistance. Fourth, in the case of using a mixture of natural soil and artificial soil, the dead load of building is increased due to the weight of the soil, which in turn affects the safety of the building. And fifth, the depth of the soil layer for planting is shallow, and so the plant species which can be utilized in afforestation are limited.

Technical Problem

An objective of the present invention is to provide a method of producing artificial bio-soil aggregates based on foamed concrete for plant growth that can ensure sufficient moisture and plant nutrients for the habitat of plants in non-soil conditions; obtain a lightweight, durable, and deep soil layer, and continuously provide a favorable environment for plant growth.

Technical Solution

In order to achieve the above objective, the principle of the present invention for solving the problem is to produce artificial bio-soil aggregates based on foamed concrete for plant growth by forming lightweight, porous, foamed concrete that is durable in an outdoor environment, and mixing said foamed concrete with hydrogel, so that the artificial bio-soil aggregates can supply sufficient moisture for plant growth, have high pest resistance, and continuously supply plant nutrients.

A variety of measures may be considered in order to address the issues, first of which is to form a lightweight prosperous cement with a specific compressive strength by mixing foam bubbles with an appropriate foaming rate with cement using a foaming agent, so as to produce foamed concrete.

Second, in order to provide an environment where plants can grow well, ochre, blast-furnace slag, gypsum, fly ash, and the like, which can weaken the alkalinity of cement of the concrete, are added to the cement. Alternatively, only hemihydrate gypsum may be used alone, or ochre, blast-furnace slag, anhydrous gypsum, fly ash, cement, and the like, may be added to the hemihydrate gypsum.

Third, through the hydrogel added to the foamed concrete, plant nutrients for nourishment for plant growth, effective microorganisms for improving pest resistance, and moisture are supplied to the plant, whereby the plant can continue to grow in the artificial bio-soil aggregates.

Advantageous Effects

Artificial bio-soil aggregates based on foamed concrete provides sufficient moisture and plant nutrients in a non-soil area so that a plant can continuously grow, and allows for a deep soil layer so that it is possible to plant a variety of plants.

Also, plant nutrients, effective microorganisms, and moisture are constantly supplied through the hydrogel, which is added in the foamed concrete, thus making it possible to establish a habitat for plants and easing the task of maintaining and managing the artificial bio-soil aggregates.

Furthermore, deep soil layers formed by artificial bio-soil aggregates reduces thermal conductivity, which in turn lowers the building's consumption of heating/cooling energy; and because the lightweight artificial bio-soil aggregates does not add to the dead load of the building, the structural safety of the building is not compromised.

DESCRIPTION OF DRAWINGS

FIG. 2 is a diagram for explaining the effects when the artificial bio-soil aggregates based on foamed concrete of FIG. 1 is applied to a rooftop of a building.

MODE FOR INVENTION

Figure 1:
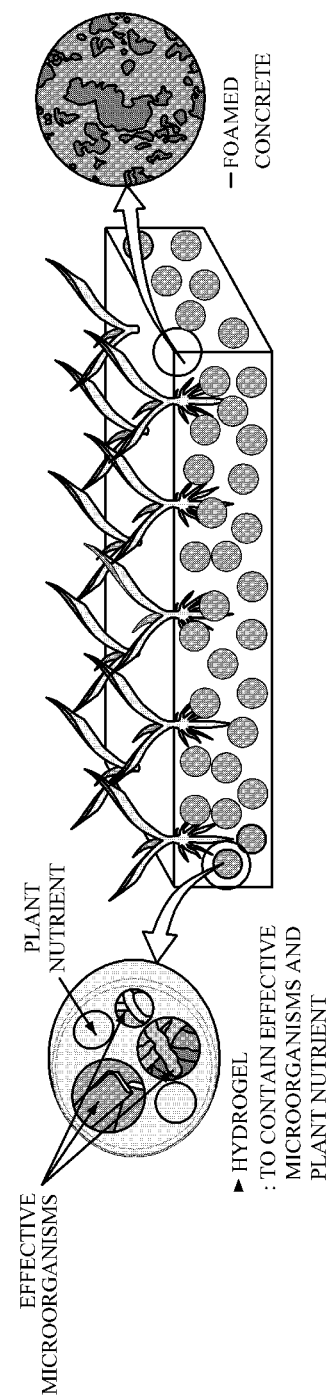
FIG. 1 is a diagram illustrating a structure of artificial bio-soil aggregates based on foamed concrete according to an exemplary embodiment of the present invention.

The invention is described more fully hereinafter with reference to the accompanying drawings, in which exemplary embodiments of the invention are shown.

According to a producing method in accordance with the present invention, a paste is prepared by mixing cement with an admixture, such as ochre and burnt-furnace slag; foamed concrete is formed by adding foam bubbles with an appropriate foaming rate to said paste, thereby producing Terra-concrete, which refers to artificial bio-soil aggregates based on foamed concrete (hereinafter, "Terra-concrete" will be referred to as a "soil concrete"). When the foamed concrete is used, a designated compressive strength can be ensured and a number of pore spaces are formed, which allow the air to be sucked and expelled therethrough and store moisture therein. Also, hydrogel that is incorporated into the foamed concrete may supply nutrients required for plant growth, improve pest resistance, and store and supply a large amount of water.

FIG. 1 is a diagram illustrating a structure of soil concrete according to an exemplary embodiment of the present invention. In the method of producing soil concrete in accordance with one exemplary embodiment, a paste is produced by adding mixing water into a binder which consists of ochre, blast-furnace slag, gypsum, fly ash, and the like; a batch of foam bubbles created by a foam generator is added to said paste to form a foamed concrete.

At this time, prior to mixing the paste with the batch of foam bubbles, hydrogel that contains effective microorganisms, plant nutrients, and moisture may be added into the paste, and then the batch of foam bubbles may be mixed into the paste, thereby completing the soil concrete.

The soil concrete needs to have a number of pore spaces in which to store moisture for plant growth and through which air is sucked in and expelled. The soil concrete also needs to be durable and maintain a specific compressive strength so that a plant can anchor its roots deeply in the soil concrete.

To this end, the foamed concrete consists of a binder, mixing water, and foam, in which the paste is prepared by mixing the binder with the mixing water at a water-to-binder-ratio of 30-50%, so that the compressive strength of the foamed concrete can be maintained at 0.2-2 MPa.

The binder is prepared by mixing 30-70% by weight of cement with 30-70% by weight of admixture, consisting of a mixture of one or more of ochre, blast-furnace slag, gypsum, and fly ash, to a density of 100-500 kg per 1 m$^3$. According to one exemplary embodiment, 50% by weight of admixture and 50% by weight of cement are mixed to achieve a density of 100-500 kg per 1 m$^3$.

Alternatively, the binder may be prepared by mixing 0-50% of hemihydrate gypsum by weight with 0-50% of admixture by weight, consisting of a mixture of one or more components (i.e., ochre, blast-furnace slag, anhydrous gypsum, or cement) to a density of 100-500 kg per 1 m$^3$. According to one exemplary embodiment, the binder may be composed of only hemihydrate gypsum, without containing an admixture.

A foaming agent that can generate foam that is resilient and has an excellent surface tension and a low defoaming rate is used so as to prevent subsidence and shrinkage cracks that occur in the event the foam bubbles collapse during a plastic state of concrete. The foaming agent is diluted in water according to an appropriate dilution ratio, whereby 2-5% by weight of the foaming agent is used per 100 parts by weight of mixing water; the foaming agent generates independent foam to achieve an appropriate foaming rate of 1,000-1,500%.

When the foaming rate is less than 1,000%, foam bubbles have a high moisture content, and accordingly, during a mixing process, the water-to-binder ratio is increased and the compressive strength is, in turn, reduced; whereas when the foaming rate is greater than 1,500%, foam bubbles have less moisture, and so the foam bubbles may collapse due to contact between the paste and the mixing water during the mixing process.

A foamed solution that is a mixture of water and an animal-based foaming agent is squeezed into the foam generator using a transfer pump, and a batch of foam bubbles is created by the foam generator; compressed air from a high-pressure compressor is sprayed to the transferred foamed solution, and the batch of foam bubbles is added to the paste.

The paste, which is a mixture of the binder and the mixing water, is mixed with the foam bubbles created by the foam generator to form foamed concrete, and at this time, the binder is used to achieve a density of 100-500 kg per 1 m$^3$, and all pore spaces of the foamed concrete in a unit volume (1 m$^3$) are filled with the foam, other than a volume occupied by the binder and water, so as to maintain the density of the foamed concrete at 100-500 kg/m$^3$.

The hydrogel added to the foamed concrete can absorb and retain water hundred times more than its weight, and consists of plant nutrients required for plant growth and effective microorganism for pest resistance.

The foamed concrete is cured and then crushed, and the crushed concrete is mixed with a hydrogel to produce an artificial soil concrete for plant growth. Here, a hydrogel that occupies 30-50% of the volume of foamed concrete is added so as to maintain the optimal amount of moisture for plant growth.

The effective microorganisms, plant nutrients, and moisture, all of which are in the hydrogel, are continuously absorbed by the plant over time; water is supplied to the plant through a plurality of pore spaces formed in the soil concrete, or rain water is absorbed and retained in said pore spaces and supplied to the plant.

The hydrogel is made to absorb the effective microorganisms, which are created by cultivating yeast, lactic acid bacteria, or photosynthetic bacteria. This allows for the plant to maintain its optimal condition. Plant nutrients that support growth, such as potassium sulfate, silica-calcium phosphate, or the like, are also absorbed by the hydrogel, so that said plant nutrients can continuously be supplied to the plant and make the soil concrete fertile.

In the case where prior to mixing the paste with the batch of foam bubbles, the hydrogel is added and thereafter the batch of foam bubbles is added to form the soil concrete, the binder is prepared by mixing 50% by weight of cement and 50% by weight of admixture, consisting of a mixture of one or more of ochre, blast-furnace slag, gypsum, and fly ash, to a density of 100-500 kg per 1 m$^3$, and the resulting binder mixture is mixed with mixing water at a water-to-binder ratio of 30-50% to produce the paste.

Then, the hydrogel is added to the paste to a volume of 0.3-0.5 m$^3$/m$^3$, that is, the hydrogel is added until the volume thereof reaches 0.3-0.5 m$^3$ per 1 m$^3$ of completed soil concrete, and thereafter, foam bubbles created by the foam generator using 2-5% by weight of foaming agent used per 100 parts by weight of mixing water, for which an appropriate foaming rate is 1,000-1,500%, is added to the paste mixture with the hydrogel so as to produce the soil concrete.

FIG. 2 is a diagram for explaining the effects when soil concrete formed in accordance with the exemplary embodiment is applied to a rooftop of a building, in which FIG. 2 shows the comparison between soil concrete of the present invention which is spread over the rooftop of the building and conventional soil concrete which consists of a mixture of natural soil and artificial soil.

As shown in FIG. 2, in comparison to the prior art, the present invention can block direct sunlight in the summer, the temperature can be reduced by evapotranspiration of moisture of the plant, solar radiation can be blocked, and the thermal conductivity of concrete on the top floor of the building can be reduced in the winter by litter layers deposited on the soil concrete and deep soil layers formed by the soil concrete, so that a reduced heating and cooling energy consumption in the summer and the winter can be achieved.

Also, because the present invention can form a deeper soil layer in comparison to the prior art, it is possible to grow broad-leaved trees that have deep roots, and since the soil concrete is lightweight, an effect of improving structural stability and economic efficiency can be obtained.

Exemplary embodiments of the present invention have been described for illustrative purpose, and the disclosed embodiments should not be construed to limit the technical spirit of the present invention, but should be construed to illustrate the spirit or scope of the present invention. The scope of the present invention is not limited by the embodiments, and the scope of the present invention should be interpreted based on the following appended claims. Accordingly, the present invention should be construed to cover all modifications or variations induced from the meaning and scope of the appended claims and their equivalents.

INDUSTRIAL APPLICABILITY

The present invention can be efficiently applied to construction sectors, and particularly, to green-related industries to create a green area in locations that lack natural soil, such as big cities.

The invention claimed is:

1. A method of producing artificial bio-soil aggregate for plant growth, the method comprising:

mixing cement with about 30 to about 70% by weight of admixture to a density in a range of about 100 kg/m$^3$ to about 500 kg/m$^3$ to form a binder, wherein the admixture consists of a mixture of one or more of ochre, blast-furnace slag, gypsum, and fly ash;

mixing the binder and a mixing water in a water-to-binder ratio of about 30:70 to about 50:50 by weight to form a paste;

foaming a foaming agent to form foam bubbles;

mixing the paste with the foam bubbles in an amount of about 2% to about 5% by weight of foaming agent to mixing water to form a foamed concrete;

curing and crushing the foamed concrete to form pieces; and mixing hydrogel with the pieces in an amount of about 30% to about 50% hydrogel by volume to form artificial bio-soil aggregate.

2. The method of claim 1, wherein the hydrogel comprises a mixture containing effective microorganisms, plant nutrients, and moisture, wherein the effective microorganisms comprise one or more of yeast, lactic acid bacteria, and photosynthetic bacteria, and wherein the plant nutrients comprise one or more of potassium sulfate and silica-calcium phosphate.

* * * * *